US008425325B2

(12) United States Patent
Hope

(10) Patent No.: US 8,425,325 B2
(45) Date of Patent: Apr. 23, 2013

(54) AUTOMATICALLY GENERATING A BOOK DESCRIBING A USER'S VIDEOGAME PERFORMANCE

(75) Inventor: Eric James Hope, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 377 days.

(21) Appl. No.: 12/367,181

(22) Filed: Feb. 6, 2009

(65) Prior Publication Data

US 2010/0203970 A1 Aug. 12, 2010

(51) Int. Cl.
*A63F 13/00* (2006.01)
(52) U.S. Cl.
USPC .................. 463/42; 463/29; 463/30; 463/31; 463/32; 463/33
(58) Field of Classification Search .......... 715/202–234, 715/769; 463/42
See application file for complete search history.

(56) References Cited

U.S. PATENT DOCUMENTS

| 5,749,735 | A  | * | 5/1998  | Redford et al. ........... 434/307 R |
| 5,761,485 | A  | * | 6/1998  | Munyan ........................ 715/839 |
| 5,956,034 | A  | * | 9/1999  | Sachs et al. .................. 715/776 |
| 6,069,622 | A  | * | 5/2000  | Kurlander ..................... 715/753 |
| 6,493,734 | B1 | * | 12/2002 | Sachs et al. .................. 715/212 |
| 7,020,663 | B2 | * | 3/2006  | Hay et al. ..................... 434/317 |
| 7,147,563 | B2 | * | 12/2006 | Miura et al. .................... 463/42 |
| 7,339,992 | B2 | * | 3/2008  | Chang et al. ............. 375/240.25 |
| 7,577,901 | B1 | * | 8/2009  | Hull et al. ..................... 715/230 |
| 7,846,025 | B2 | * | 12/2010 | Whitten et al. ................. 463/43 |
| 2002/0082063 | A1 | * | 6/2002 | Miyaki et al. ..................... 463/1 |
| 2002/0111216 | A1 | * | 8/2002 | Himoto et al. .................. 463/43 |
| 2002/0184189 | A1 | * | 12/2002 | Hay et al. .......................... 707/1 |
| 2003/0003998 | A1 | * | 1/2003 | Toriyama et al. ............... 463/43 |
| 2003/0018663 | A1 | * | 1/2003 | Cornette et al. ........... 707/500.1 |
| 2003/0028380 | A1 | * | 2/2003 | Freeland et al. .............. 704/260 |
| 2005/0172231 | A1 | * | 8/2005 | Myers .......................... 715/716 |
| 2005/0201619 | A1 | * | 9/2005 | Sun et al. ...................... 382/176 |
| 2006/0058103 | A1 | * | 3/2006 | Danieli et al. ................... 463/42 |
| 2007/0002144 | A1 | * | 1/2007 | Tsuchida et al. ........... 348/207.1 |
| 2007/0005616 | A1 | * | 1/2007 | Hay et al. ...................... 707/100 |
| 2007/0044010 | A1 | * | 2/2007 | Sull et al. ................... 715/500.1 |
| 2007/0087798 | A1 | * | 4/2007 | McGucken ...................... 463/1 |
| 2007/0094333 | A1 | * | 4/2007 | C. Schilling et al. ......... 709/206 |
| 2007/0109599 | A1 | * | 5/2007 | Schacht et al. ............... 358/1.18 |
| 2007/0147654 | A1 | * | 6/2007 | Clatworthy et al. .......... 382/100 |
| 2007/0168315 | A1 | * | 7/2007 | Covannon et al. ................ 707/1 |

(Continued)

FOREIGN PATENT DOCUMENTS

WO    WO 2006122329 A2 * 11/2006

*Primary Examiner* — N Drew Richards
*Assistant Examiner* — Ankush Singal
(74) *Attorney, Agent, or Firm* — Novak Druce Connolly Bove + Quigg LLP

(57) ABSTRACT

Systems and methods are provided that record data in a videogame, such as a user's character and performance in the videogame, and generate a book, e-book, or comic book based on the recorded data. A narrative data structure generated from the recorded data may include pregenerated text and images, and may provide for insertion of the recorded data into the narrative data structure. The recorded data may be converted into natural-language text for insertion into the narrative data structure. In some embodiments, the system may record screenshots of the videogame and insert the screenshots into the narrative data structure as illustrations. The narrative data structure may be provided to a location for printing as a book or other publication or may be electronically formatted and provided as an e-book.

25 Claims, 14 Drawing Sheets

U.S. PATENT DOCUMENTS

| | | | |
|---|---|---|---|
| 2007/0168864 A1* | 7/2007 | Yamamoto et al. | 715/716 |
| 2007/0226648 A1* | 9/2007 | Hudson et al. | 715/810 |
| 2007/0244798 A1* | 10/2007 | Weidenbenner | 705/37 |
| 2007/0250496 A1* | 10/2007 | Halliday et al. | 707/5 |
| 2007/0294089 A1* | 12/2007 | Garbow et al. | 705/1 |
| 2008/0119281 A1* | 5/2008 | Hirose et al. | 463/42 |
| 2008/0256066 A1* | 10/2008 | Zuckerman et al. | 707/5 |
| 2008/0320378 A1* | 12/2008 | Shuter et al. | 715/203 |
| 2009/0017886 A1* | 1/2009 | McGucken | 463/1 |
| 2009/0150760 A1* | 6/2009 | Winkler et al. | 715/202 |
| 2009/0158136 A1* | 6/2009 | Rossano et al. | 715/232 |

* cited by examiner

AUTOMATICALLY GENERATING A BOOK DESCRIBING A USER'S VIDEOGAME PERFORMANCE

BACKGROUND

1. Technical Field

The present disclosure relates generally to videogames played on electronic devices and, more particularly, to increasing user engagement with videogames.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronically played games (sometimes referred to as "videogames," or "computer games") are programs executed on various electronic devices. The games may be played on such electronic devices as computers, game-specific computers (referred to as "videogame consoles") and portable electronic devices, such as phones, PDA's, portable media players, handheld videogame devices, etc. During play of videogames, a user interacts with the electronic device by using input devices to respond to the game, such as by solving puzzles, making choices, and executing hand-eye coordination movements in response to the displayed videogame images.

Many videogames allow customization of the user's representation in the videogame (referred to as the player character.) Further, the videogames often offer the user a variety of choices that determine a course of action, e.g., multiple ways to solve a puzzle, multiple dialogue choices to interact with a non-player character, etc. In many games, the user's character and choices are integrated into a story. The story may or may not be responsive to the user's character and choices. Typically, the user's position in the game (or place in the story) is recorded automatically or manually though the use of recorded data. This data is often recorded or "saved" as a file (referred to as a "saved game"). However, after completion of the videogame, the user's interaction with the game (and any story presented in the game) is complete. Further, the user may be unable to directly access the saved game file to view any data recorded throughout the game. Even if the user is able to access the saved game file, the recorded data may be difficult to relate to the game and/or the story, and may be recorded in a format unrecognizable to the user.

SUMMARY

Certain aspects commensurate in scope with the certain embodiments of the present disclosure are set forth below. It should be understood that these aspects are presented merely to provide the reader with a brief summary of these embodiments and that these aspects are not intended to limit the scope of the disclosure or claims. Indeed, the disclosure and claims may encompass a variety of aspects that may not be set forth below.

The present disclosure generally relates to systems and method for generating a book, e-book, or comic book from data recorded from a videogame. In accordance with one disclosed embodiment, data may be recorded from a videogame executed on an electronic device. The recorded data may include character information, dialogue from the videogame, and results and metrics reflecting the performance of the user in the videogame. The recorded data may be inserted into a narrative data structure having pregenerated text. In some embodiments, the recorded data may be used as the basis for selecting among a plurality of pregenerated text. A book, e-book, or comic book may be produced from the narrative data structure. The electronic device may send the e-book to a user of the electronic device, or send the narrative data structure to a server for printing.

In another embodiment, the recorded data may be sent from the electronic device to a server. The server may generate a narrative data structure from the recorded data. The server may send an e-book to the electronic device and/or to a user of the electronic device. Additionally, the server may print a book from the narrative data structure, and the book may be mailed to a user.

BRIEF DESCRIPTION OF THE DRAWINGS

Advantages of the disclosure may become apparent upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 2:
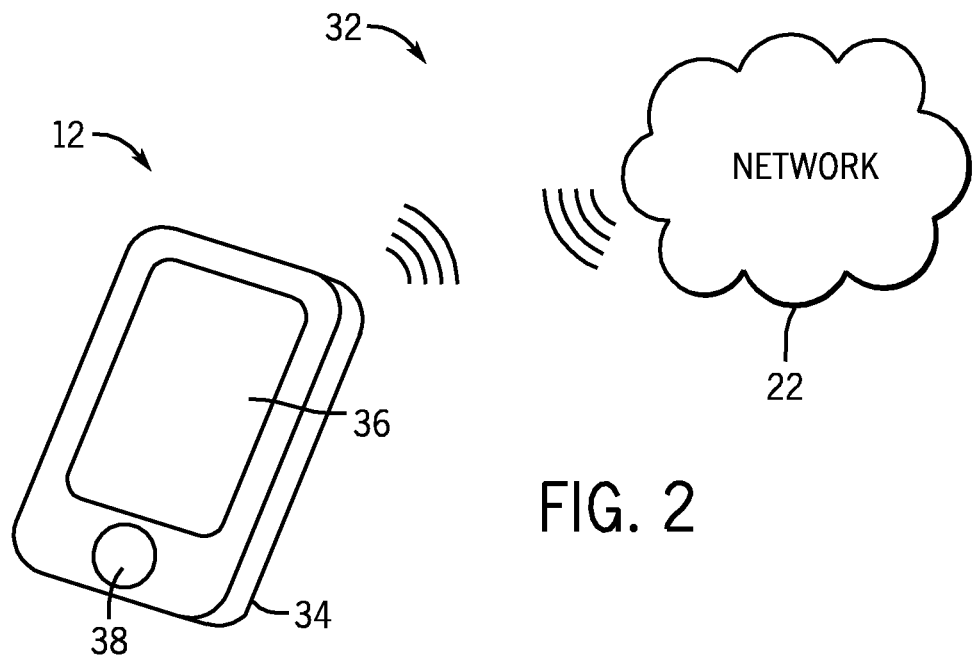
FIG. 2 is an electronic device for playing videogames in accordance with another embodiment of the present disclosure.
Figure 3:
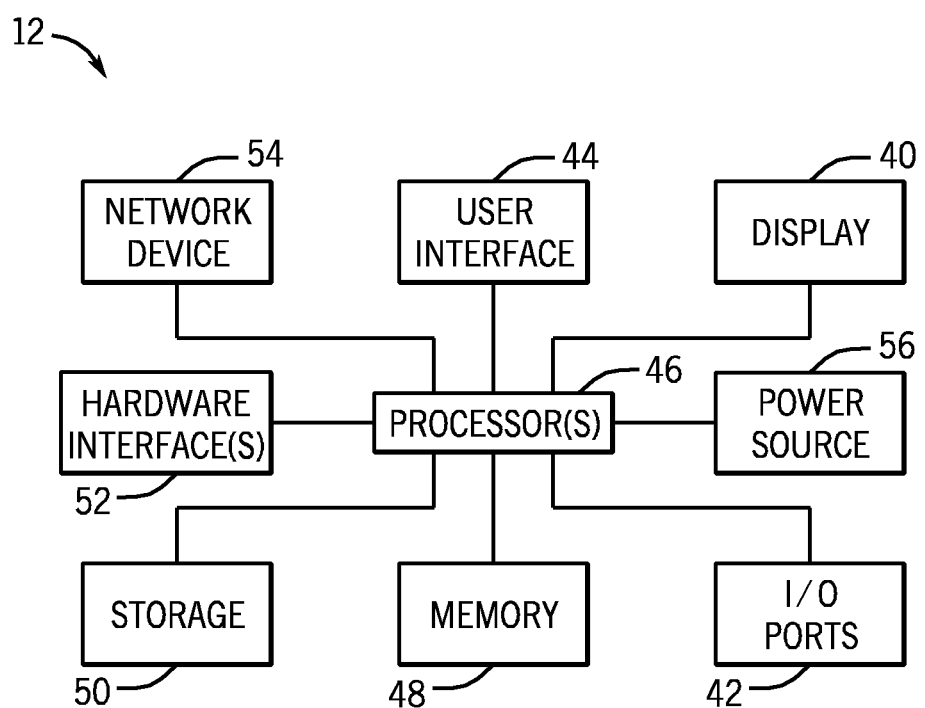
FIG. 3 is a simplified block diagram of the portable media player of FIG. 1 in accordance with one embodiment of the present disclosure.

Embodiments of the present disclosure include systems, devices, and techniques for recording data from a videogame and generating a book, e-book, or comic book from the recorded data. Embodiments may include an electronic device, such as a computer or a videogame console, which generates a narrative structure from the recorded data. The narrative structure may be converted into a book, e-book, or comic book, and the book, e-book, or comic book may be physically or electronically sent to a user. In some embodiments, the recorded data may be sent from an electronic device over a network to a server, and the server may generate a narrative structure from the recorded data. By way of example, FIGS. 1, 2, and 3 depict systems and electronic devices that may provide for playing of a videogame, recording data from the videogame, and generation of a book, e-book, or comic book based on the recorded data.

Figure 1:
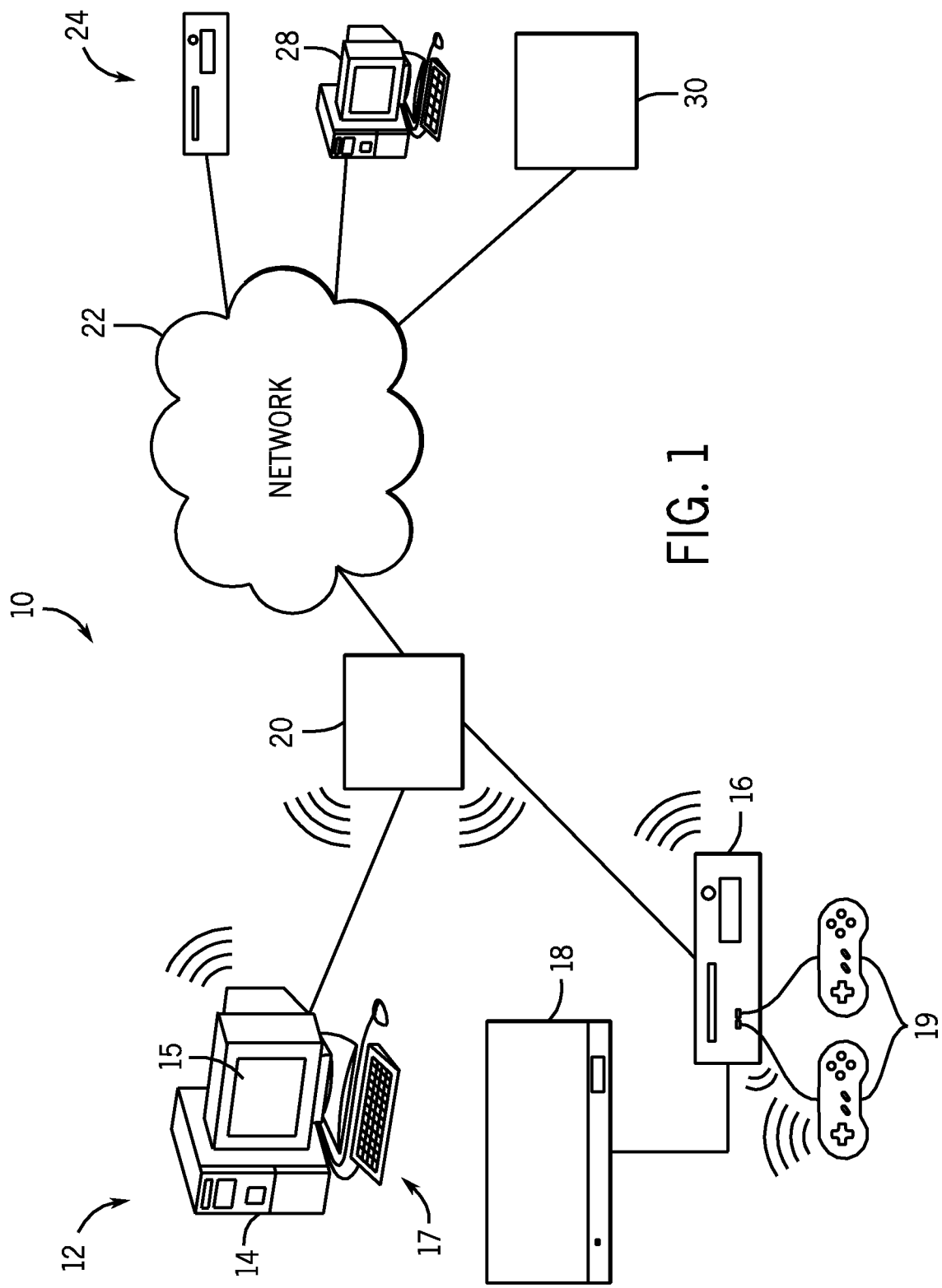
FIG. 1 is a system having electronic devices capable of executing videogames in accordance with an embodiment of the present disclosure.

FIG. 1 depicts a system that may be used when playing a videogame (also referred to as a "computer game") and generating a book, e-book, or comic book from the videogame in accordance with an embodiment of the present disclosure. In one embodiment, the system 10 may include one or more electronic devices 12 capable of playing videogames. For example, the electronic device 12 may include a computer 14, such as a desktop, laptop, or server. By way of example, the computer 14 may be a computer manufactured by Apple Inc. The computer 14 may execute any operating system suitable for managing the resources of the computer 14, executing applications (e.g., videogames) and providing a user interface to a user. The operating system and applications may be stored on any tangible computer-readable storage media accessible to the computer 14. In some embodiments, the operating system may be OS X® manufactured by Apple Inc., Windows XP®, Windows Vista®, or Windows 7® manufactured by Microsoft, Linux, or Unix®. The computer 14 may integrally or separately include a display 15, and may be physically or wirelessly coupled to one or more input devices 17, e.g., a mouse and keyboard. The input devices 17 may allow interaction with the computer 14, and may enable a user to play videogames on the computer 14 and generally interact with a user interface (e.g., as provided by an operating system) of the computer 14.

In some embodiments, the electronic device 12 may include a console 16 coupled to a display 18. The console 16 may be physically or wirelessly coupled to an input device 19, e.g., a "controller," that enables a user to control the console 16 and enables a user to play videogames on the console 16. The input device 17 may include a motion-activated controller that enables a user to control the console 16 and play a videogame by physically moving the controller.

The console 16 may be a videogame console, such as a Microsoft Xbox®, Microsoft Xbox360®, Sony Playstation®, Sony Playstation 2®, Sony, Playstation 3®, Nintendo Gamecube®, Nintendo Wii®, or any suitable game console. In other embodiments, the console may be or may include a digital video recorder (DVR), a DVD player, a CD player, a digital audio player, an audio receive, a video receiver, a cable converter box, a satellite receiver, a streaming media player, and/or any combination thereof. The display 15 coupled to the computer 14 and the display 18 coupled to the console 16 may be any suitable display, such as a plasma display, LCD display, DLP display, CRT display, laser display, OLED display, laser display, etc.

The electronic device 12, e.g., the computer 14 and console 16, may be physically or wirelessly coupled to a networking interface 20 to enable communication to and from a network 22. In some embodiments, the networking interface 20 may be a cable modem, DSL modem, satellite modem, router, switch, hub, and/or any combination thereof. The network 22 may include a local-area-network (LAN), wide-area-network (WAN), campus-area network (CAN), municipal area network (MAN) and/or the Internet. The electronic device 12 may communicate with other electronic devices 24 over the network 22. For example, the electronic devices 24 coupled to the network 22 may include additional consoles 26 and/or computers 28. In some embodiments, a videogame executed on the electronic device 12 may enable users of the electronic device 12 to interact with users of the console 26 and/or 28 over the network 22, such as by playing a videogame against or with other users. Additionally, the electronic device 12 may communicate with a server 30 coupled to the network 22. For example, the computer 14 and/or the console 18 may send and receive data to and from the server 30, such as software updates, videogame data, etc. As described below, in some embodiments, the server 30 may receive recorded data of the videogame from the electronic device 12.

FIG. 2 depicts a system 32 illustrating another embodiment of an electronic device 12, e.g. portable electronic device 34, in accordance with an embodiment of the present disclosure. In some embodiments, the portable electronic device 34 may be a media player for playing music and/or video, a cellular phone, a personal data organizer, or any combination thereof. Thus, the electronic device 12 may be a unified device providing any one of or a combination of the functionality of a media player, a cellular phone, a personal data organizer, and so forth. In addition, the portable electronic device 34 may allow a user to connect to and communicate through the network 22, including a cellular network, local-area-network (LAN), wide-area-network (WAN), campus-area network (CAN), municipal area network (MAN) and/or the Internet. For example, the portable electronic device 34 may allow a user to communicate using e-mail, text messaging, instant messaging, or using other forms of electronic communication. By way of example, the portable electronic device 34 may be a model of an iPod® having a display screen or an iPhone® available from Apple Inc. In some embodiments, the portable electronic device 34 may be a portable videogame console, such as Nintendo DS® or Game Boy® manufactured by Nintendo, Inc., PlayStation Portable® manufactured by Sony, or any suitable portable videogame console.

The portable electronic device 34 may include a display 36 and input device 38. The display 36 may be a liquid crystal display (LCD), a light emitting diode (LED) based display, an organic light emitting diode (OLED) based display, or other suitable display. In accordance with certain embodiments of the present technique, the display 36 may display a user interface as well as various images, such as logos, avatars, photos, album art, and so forth. Additionally, in one embodiment the display 36 may be a touch screen through which a user may interact with the user interface. The display 36 may also display various function and/or system indicators to provide feedback to a user, such as power status, call status, memory status, etc. These indicators may be in incorporated into the user interface displayed on the display 36.

In one embodiment, one or more of the user input devices 38 are configured to control the device 34, such as by controlling a mode of operation, an output level, an output type, etc. For instance, the user input structures 38 may include a button to turn the device 34 on or off. In general, embodiments of the electronic device 34 may include any number of user input structures 38, including buttons, switches, a control pad, keys, knobs, a scroll wheel, or any other suitable input structures. The input devices 38 may work with a user interface displayed on the device 34 to control functions of the device 12 or of other devices connected to or used by the device 34. For example, the user input structures 38 may allow a user to navigate a displayed user interface or to return such a displayed user interface to a default or home screen.

Turning now to FIG. 3, a block diagram of components of an illustrative electronic device 12 is shown in accordance with an embodiment of the present disclosure. The block diagram includes a display 40, I/O ports 42, a user interface 44, one or more processors 46, a memory 48, storage 50, hardware interface(s) 52, networking device 54, and power source 56.

As discussed herein, in certain embodiments the user interface 44 may be displayed on the display 40, and may provide a means for a user to interact with the electronic device 12. The user interface 44 may be a textual user interface, a graphical user interface (GUI), or any combination thereof. The user interface 44 may, in certain embodiments, allow a user to interface with displayed interface elements via the one or more input devices, e.g., mouse and keyboard, controller, etc., and/or via a touch sensitive implementation of the display 40. In such embodiments, the user interface 44 provides interactive functionality, allowing a user to select, by touch screen or other input structure, from among options displayed on the display 40. Thus the user can operate the device 12 by appropriate interaction with the user interface 44. Further, as described above, the user interface 44 may enable the selection and control of videogames displayed on the display 40, via input devices coupled to the I/O ports 42.

The processor(s) 42 may provide the processing capability to execute the operating system, programs, videogames, user interface 44, and any other functions of the device 12. The processor(s) 42 may include one or more microprocessors, such as one or more "general-purpose" microprocessors, a combination of general and special purpose microprocessors, and/or ASICS. For example, the processor(s) 42 may include one or more reduced instruction set (RISC) processors, such as a RISC processor manufactured by Samsung, as well as graphics processors, video processors, and/or related chip sets.

Embodiments of the electronic device 12 may also include a memory 48. The memory 48 may include a volatile memory, such as RAM, and a non-volatile memory, such as ROM. The memory 48 may store a variety of information and may be used for a variety of purposes. For example, the memory 48 may store the firmware for the device 12, such as an operating system for the device 12 and/or any other programs or executable code necessary for the device 12 to function. In addition, the memory 48 may be used for buffering or caching during operation of the device 12.

The device 12 in FIG. 3 may also include non-volatile storage 50, such as ROM, flash memory, a hard drive, any other suitable optical, magnetic, or solid-state storage medium, or a combination thereof. The storage 50 may store data files such as media (e.g., music and video files), software (e.g., for implementing functions on device 12), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), telephone information (e.g., telephone numbers), and any other suitable data. Additionally, as described in detail below, the storage 50 may store recorded data from a videogame executed on the device 12.

The embodiment in FIG. 3 also includes one or more hardware interfaces 52. The hardware interfaces 52 may receive expansion cards that may be used to add functionality to the device 12, such as additional memory, I/O functionality, or networking capability. The expansion card may connect to the device 12 through any type of connector and may be accessed internally or externally to the device 12. For example, in one embodiment the hardware interfaces 52 may receive a flash memory card, such as a SecureDigital (SD) card, mini- or microSD, CompactFlash card, Multimedia card (MMC), etc. In other embodiments, the hardware interfaces 52 may include ISA, PCI, PCI-X, AGP, PCI-Express, etc. Additionally, in some embodiments the hardware interfaces 52 may receive a Subscriber Identity Module (SIM) card, for use with an embodiment of the electronic device 12 that provides mobile phone capability.

The device 12 depicted in FIG. 3 also includes a network device 54, such as a network controller or a network interface card (NIC). In one embodiment, the network device 54 may be a wireless NIC providing wireless connectivity over any 802.11 standard or any other suitable wireless networking standard. The network device 54 may allow the device 12 to communicate over the network 22, such as a cellular network, LAN, WAN, CAN, MAN, or the Internet. Further, the device 12 may connect to and send or receive data with any device on the network, such as other portable electronic devices, personal computers, printers, etc. Alternatively, in some embodiments the electronic device may not include a network device 54. In such an embodiment, a NIC may be added into the hardware interfaces 52 to provide similar networking capability as described above.

The device 12 may also include or be connected to a power source 56. In one embodiment, the power source 56 may be a battery, such as a Li-Ion battery. In such embodiments, the battery may be rechargeable, removable, and/or attached to other components of the device 12. Additionally, in certain embodiments the power source 56 may be an external power source, such as a connection to AC power and the device 12 may be connected to the power source 56 via one or more of the I/O ports 42.

As described above, a user may use the electronic device 12 to play a videogame. The videogame may be stored on a tangible computer-readable medium accessible to the electronic device 12. The videogame may be stored on the storage 50, and/or the memory 48, and may be stored on removeable optical media, such as a CD, DVD, etc. During play of a videogame, a user may make choices, resolve conflicts, solve puzzles, etc. These choices, conflicts, and puzzles, and any related data may be recorded by the electronic device 12, so that the user's performance (such as results and metrics) and other data relating to the user's play may be recorded on the storage 50.

Figure 4:
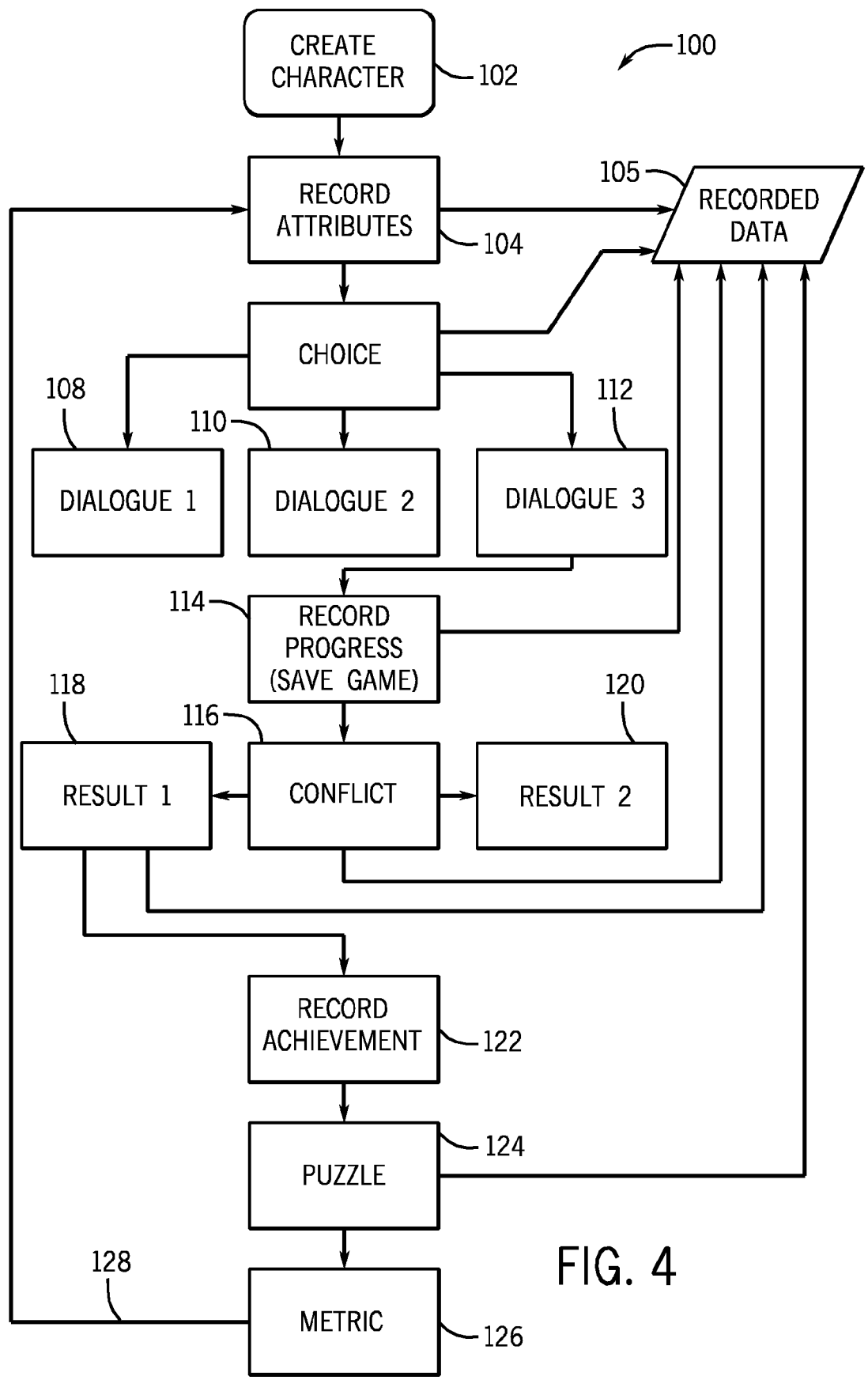
FIG. 4 is a flowchart illustrating a user's play of a videogame and the data that may be recorded at different points in the game in accordance with an embodiment of the present disclosure.

FIG. 4 is a flowchart 100 depicting a user's play of a videogame, and the various data that may be recorded at different points in the game, in accordance with an embodiment of the present disclosure. A user may play a videogame, and resume playing at a later time, such that data may be recorded throughout the play until the user completes the videogame. Further, each user's play through a videogame may result in different recorded data, resulting in a different experience for each user.

Initially, at the start of the videogame, the user may create a character (block 102) having attributes (e.g., name, appearance, etc.) and other information. After character creation, the attributes and any other character information may be written (block 104) as recorded data 105. It should be appreciated that, in other embodiments, the videogame may not write the attributes immediately after character creation and may write the attributes at a later point in the videogame. As the user progresses in the videogame, the user may be confronted with a choice (block 106), such as a choice of dialogue, choice of action, etc. For example, the user may have the choice of selecting a first dialogue response (block 108), a second dialogue response (block 110), or a third dialogue response (block 112). In this particular embodiment, the user may select the third dialogue (as indicated by the bold line). The selection of the third dialogue (block 112) may be written to the recorded data 105. In some embodiments, the user's progress may be periodically recorded (block 114), such as through a manual or automatic "save game" command.

As the user progresses through the videogame, the user may encounter a conflict (block 116), such as combat with another player character, a non-player character, etc. Depending on the user's performance, the conflict may resolve in either a first result (block 118) or second result (block 120). In the illustrated embodiment, the user may reach the first result (block 118) as shown by the bolded line. The first result (block 118), and any other data relating to the first result may be written to the recorded data 105. In some embodiments, the user's progress in the videogame may be noted as an achievement (block 122), such as resolving the conflict 116, reaching a specific point in the story of the videogame, reaching a specific character level, etc. This achievement, any other information relating to the achievement, may be written to the recorded data 105. In some embodiments, the videogame may include a puzzle (block 124). As the user attempts to solve the puzzle, any metric relating to the puzzle (e.g., time taken to solve the puzzle), may be written to the recorded data 105. The user may continue to play the videogame (line 128), encountering any number of choices, conflicts, achievements, puzzle, etc., any or all of which (and any related data) may be written to the recorded data 105. Each choice, conflict, achievement, and/or puzzle may result in data specific to the user's results, metrics, and other performance written to the recorded data 105.

Figure 5:
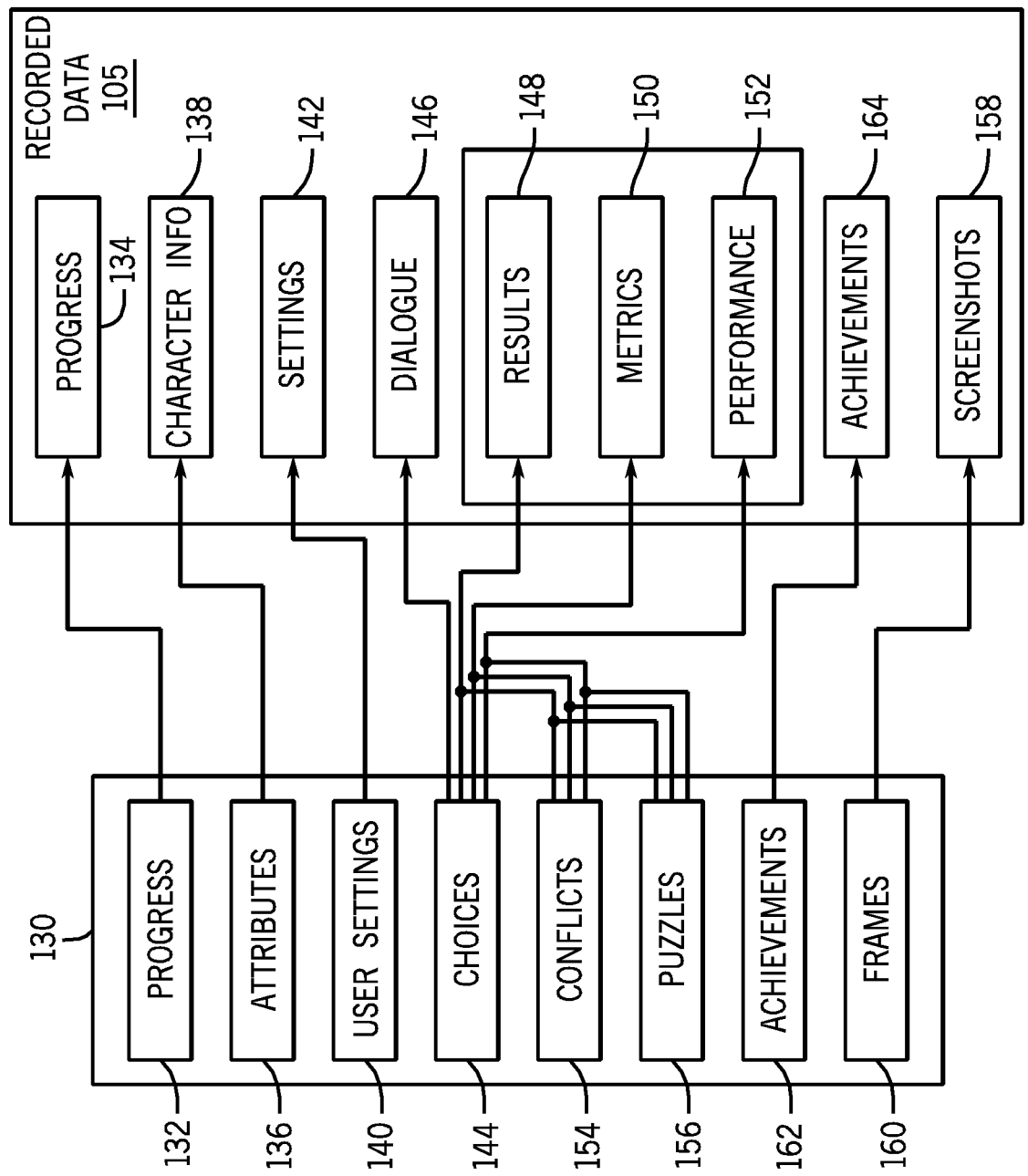
FIG. 5 is a block diagram illustrating the interaction between a videogame and recorded data in accordance with an embodiment of the present disclosure.

FIG. 5 is a block diagram illustrating the interaction between a videogame 130 and recorded data 105 in accordance with an embodiment of the present disclosure. The videogame 130 may be played on the electronic device 12, and the recorded data 105 may be written to the storage 50 during or after playing of the videogame 130. The recorded data 105 may be written to the storage 50 continuously during play of the videogame 130, or the recorded data 105 may be written to the storage 50 at discrete points of the videogame 130, such as at the end and/or beginning of chapters, levels, areas, etc. of the videogame 130.

The videogame 130 may monitor the progress 132 of the user in the videogame 130. For example, the progress 132 may indicate the user's current location in the videogame 130, such as the location in a level, chapter, area, and/or narrative. This progress 132 may be written to the recorded data 105, such that the recorded data 105 includes a recorded progress 134. Thus, a user may resume the videogame 130 at the point indicated by the recorded progress 134. Additionally, as described below, the recorded progress 134 may be used to cross-reference other recorded data to aid placement of the recorded data in a narrative data structure.

As mentioned above, the videogame 130 may write various other data to the recorded data 105. In some embodiments, the videogame 130 may record data suitable for conversion into a narrative data structure and generation of a book, e-book, comic book, etc. from the narrative data structure. In other embodiments, the videogame 130 may be updated to enable recording of other data suitable for conversion into a narrative data structure, such as by a software update (e.g., a "patch"). In yet other embodiments, implementation of the recording of data for use in a narrative data structure may be performed at the design and development stage of the videogame 130.

In some embodiments, data written to the recorded data 105 may include any data that reflect a user's progress, choices, results, metrics and other performance in a videogame 130. For example, the videogame 130 may create and use attributes 136, such as attributes of the user's character in the videogame 130. Such attributes 136 may include the appearance of the character (e.g., apparel, color of hair, skin, eyes, age, size, etc.), statistics of the character (e.g., numerical representations of health, strength, intelligence, agility/dexterity, charisma, luck, or any other statistic), skills possessed by the character and the corresponding statistics of those skills, inventory of the character (e.g., possessions such as items, weapons, etc.). These attributes 136 may be written to the recorded data 105 as character information 138. Any modified or new attributes 136 may replace the recorded character information 138, or any modified or new attributes 136 may be appended to the recorded character information 138. For example, modified or new attributes 136 may be appended to the recorded character information 138 in chronological order, reflecting change of the user's character as the user progresses through the videogame 130. Additionally, in some embodiments, the recorded character information 138 may be cross-referenced with the recorded progress 134, such as by mapping recorded character information 138 to a point in the recorded progress 134.

Additionally, the user may modify and/or add user settings 140 of the videogame 130. These user settings 140 may include gameplay settings (e.g., difficulty), graphical settings, audio settings, control settings, etc. The user settings 140 may also be written to the recorded data 105 as recorded user settings 142.

As mentioned above, the videogame 130 may present to the user one or more choices 144 during play of the videogame 130. The choices 144 may include any choices relating to the gameplay and/or the narrative of the videogame 130. For example, such choices 144 may include dialogue choices, such as a dialogue branch (e.g., during interaction with player characters or non-player characters), path choices (e.g., selection of a location and/or direction within a two or three-dimensional virtual world), and/or any other choice. Each choice 144 and any data relating to the choice may be written to the recorded data 105. For example, as shown in FIG. 5, the recorded data 105 may include recorded dialogue 146 (e.g., text and/or audio), results 148 (e.g., the selection made by the user), metrics 150 (e.g., time taken to select). The results 148 and metrics 150 may be a part of the recorded performance 152 of the user. The recorded performance 152 may include the results 148, metrics 150, or any other data indicative of the user's performance in the videogame. In some embodiments, the choices 144 and related data may be saved in a specified order, e.g., chronological order. The dialogue 146, results 148, metrics 150, and performance 152 of the choices 144 may be cross-referenced with the recorded progress 134, such as by mapping the dialogue 146 and/or results 148 made by the user to a point in the recorded progress 134. Similarly, the dialogue 146, results 148, metrics 150 and any other performance 152 may be cross-referenced with the recorded character information 138, such as by mapping the dialogue 146 and/or results 148 to character information 138 to indicate the impact of a choice 144 on the character information.

As mentioned above, the videogame 130, the user may present to the user one or more conflicts 154, such as combat with other player characters or non-player characters. These conflicts 154 may be resolved by the user in real-time, turn-based, or any other suitable gameplay type. For example, a real-time conflict may involve the user's reflexes and hand-eye-coordination (such as through the mouse and keyboard, controller, etc.) to resolve the conflict. In such embodiments, data related to the conflicts 154 may be written to the recorded data 105. For example, the results of the conflicts 154 (e.g., if the user was successful or unsuccessful, the degree of success or failure, if a player character or non-player character was killed, etc.), and the user's performance and metrics of the conflicts (e.g., time to complete the conflict, points scored, points lost, and/or any other statistical data) may be written to the recorded data 105. As discussed above, the results 148, metrics 150, and any other performance 152 relating to the conflicts 154 may be saved in chronological order or any other order in the recorded data 105. Additionally, the recorded results 148, metrics 150 and any other performance 152 may be cross-referenced with the recorded character information 138, recorded dialogue 146, and/or the recorded progress 134.

The videogame 130 may also include puzzles 156, such as hand-eye coordination puzzles, timed puzzles, logic puzzles, and/or any other type of puzzle. In some embodiments, the videogame 130 may exclusively include the puzzles 156, and in other embodiments the puzzles 156 may be implemented into other gameplay types and/or a narrative of the videogame 130. The puzzles 156 and data relating to the puzzles 156 may be written to the recorded data 105. The results 148 of the puzzle 156 (e.g., solved, unsolved, etc.) metrics 150 (e.g., time elapsed, number of moves), and any other performance 152 may be written to the recorded data 105. As mentioned above, the data relating to the puzzles 156 may be saved in chronological order or any other order in the recorded data 105. Additionally, the recorded results 148, metrics 150, and any other performance 152 may be cross-referenced with the recorded character information 138, recorded dialogue 146, and/or the recorded progress 134.

In yet other embodiments, screenshots 158 of the videogame 130 may be written to the recorded data 105. The screenshots 158 may be a capture of a frame 160 of the displayed data of the videogame 130. The screenshots 158 may be captured at any point during play of the videogame 130. For example, the screenshots 158 may be taken any time that data is written to the recorded data 105, upon the modification or addition of any attributes 136, the selection of any of the choices 144, the resolution of any of the conflicts 154, the completion of any of the puzzles 156, etc. Further, screenshots 158 may be cross-referenced to any other recorded data 105, such as the recorded character information 138, recorded dialogue 146, recorded results 148, recorded metrics 150, and any other recorded performance 152, and/or the recorded progress 134. For example, during recording of character information 138, a screenshot of the user's character may be written to the recorded data 105. In another example, after a user reaches a specific progress 132 in the videogame 130, a screenshot illustrating the progress 132 (e.g., a screenshot of the level, chapter, etc.) may be written to the recorded data 105.

Additionally, the user may complete specific achievements 162 in the videogame 130. These achievements may correlate to any specific accomplishments reached by the user in the videogame 130. It should be appreciated the achievements 162 may include the "Achievement" points available for the Xbox 360® manufactured by Microsoft, Inc. For example, the achievements 162 may include solving a specific number of puzzles, resolving a specific number of conflicts (e.g., killing a threshold number of "enemies), finding a specific type or number of "items" in the videogame 130, etc. These achievements 162 may also be written to the recorded data 105, as shown by recorded achievements 164. The recorded achievements 164 may also be cross-referenced to any other recorded data 105, such as the recorded character information 138, recorded dialogue 146, recorded results 148, recorded metrics 150 and any other recorded performance 152, and/or the recorded progress 134.

In accordance with embodiments of the disclosure, during play or after completion of the videogame 130, the recorded data 105 may be combined with other data (such as pregenerated text) and converted into a narrative data structure. This narrative data structure may be the basis of a book, e-book, comic book, etc., which reflects the user's videogame experience. As noted above, because of the user's character and the various choices, conflicts, puzzles, etc., presented to the user, each user's videogame experience may be different, resulting in a different book, e-book, or comic book for each user.

Figure 6:
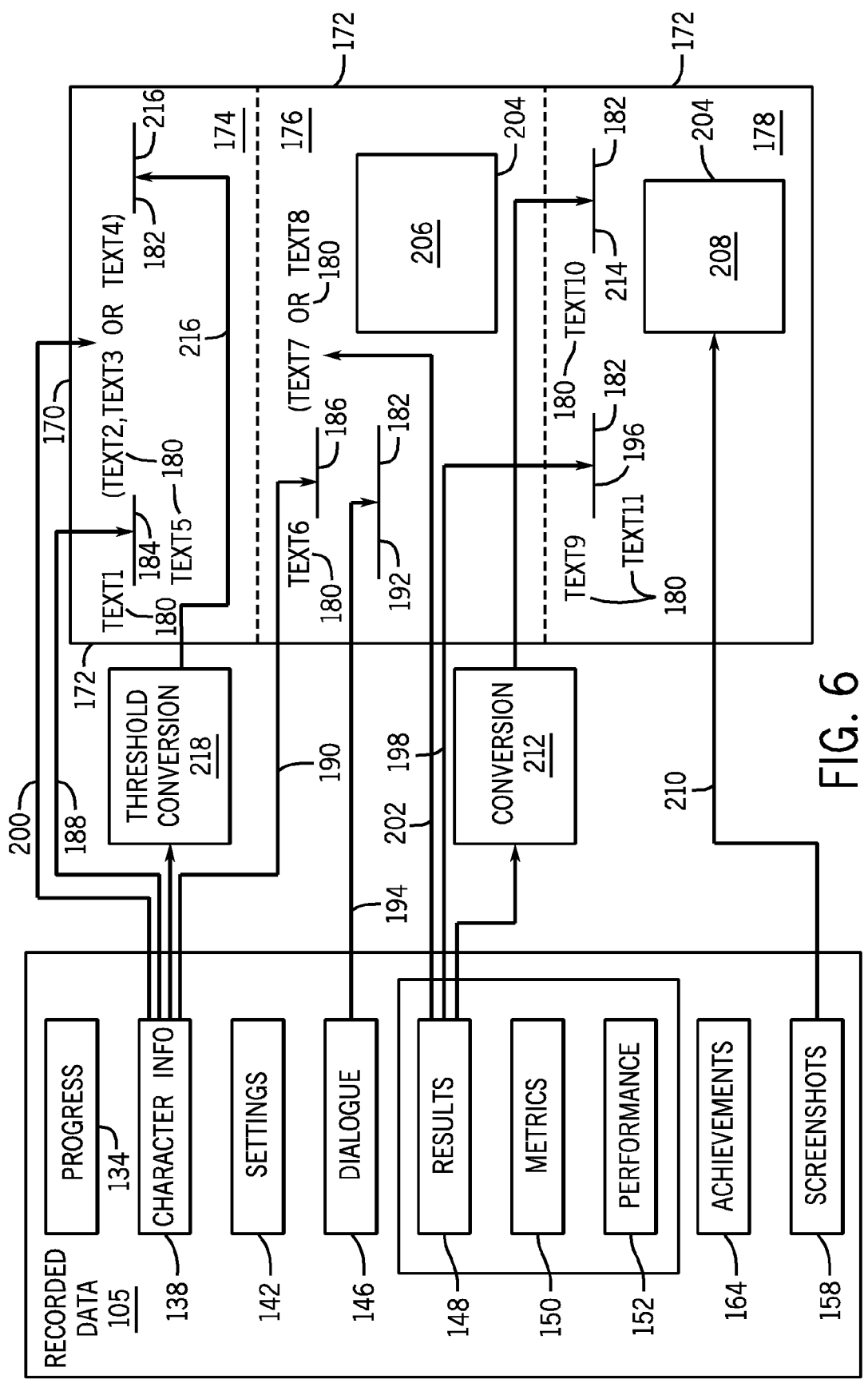
FIG. 6 is a block diagram illustration generation of a narrative data structure from the recorded data of FIG. 5 in accordance with an embodiment of the present disclosure.

FIG. 6 is a block diagram illustrating conversion of the recorded data 105 into a narrative data structure 170. The narrative data structure 170 may include different sections 172, (e.g., beginning 174, middle 176, end 178, chapters, etc.). Each section 172 may include pregenerated text 180 (represented as "TEXT1," "TEXT2," "TEXT3," etc.). The pregenerated text 180 may be natural-language text relating to the videogame 130, such as describing the gameplay and/or story of the videogame 130. For example, in the first section 172, TEXT1 may include an introduction to a narrative describing the videogame 130. Similarly, in section 178, TEXT11 may include a conclusion to a narrative describing the videogame 130. In some embodiments, the pregenerated text 180 may be specific to the gameplay and/or narrative of the videogame 130. In other embodiments, the pregenerated text may be include or may be generic text (e.g., one or more sections 172 of the narrative data structure 170 may form a generic beginning, middle, and end useable with any recorded data 105).

The recorded data 105 may be inserted into the narrative data structure 170 to complete generation of the narrative data structure 170. Portions of the recorded data 105 may be inserted before, after, or between the pregenerated text 180. In one embodiment, placeholders 182 or any other indicators may be used to indicate those portions of the narrative data structure 170 that receive portions of the recorded data 105. In other embodiments, portions of the recorded data 105 may be inserted by reference to the pregenerated text 180. For example, in the first section 172 of the narrative data structure 170, the recorded character information 138 from the recorded data 105 may be inserted into a placeholder 184, and in the second section 174, the recorded character information 138 may be inserted into placeholder 186, as shown by arrows 188 and 190 respectively. Similarly, recorded dialogue 146 may be inserted into a placeholder 192 as shown by arrow 194, recorded results 148, may be inserted into a placeholder 196 as shown by arrow 198, etc. In other embodiments, the pregenerated text 180 may also be inserted into placeholders 182. For example, a narrative data structure 170 may be generated by inserting both pregenerated text 180 and recorded data 105 into the narrative data structure 170.

Alternatively, in some embodiments the recorded data 105 may be used as the basis for selecting among pregenerated text 180. For example, as shown in FIG. 6, the selection between TEXT2, TEXT3, or TEXT4, may be based on the recorded character information 138, as shown by arrow 200. Thus, depending on the text, value, or other data of the character information 138, either TEXT2, TEXT3, or TEXT4 may be selected and added to the narrative data structure 170. In another example, the selection between TEXT7 or TEXT8 may be based on recorded results 148, as shown by arrow 202. For example, if a recorded result 148 indicates "success" or "failure", TEXT7 may include text corresponding to "success" and TEXT8 may include text corresponding to "failure." In this manner, pregenerated text may be selected based on the recorded data 105, creating portions of the narrative data structure that are customized based on the user's videogame experience. Any number of pregenerated text may be available and selected based on the prerecorded text 105.

In some embodiments, the narrative data structure 170 may include illustrations 204. Similar to the pregenerated text 180, the illustrations 204 may include a pregenerated illustration 206. For example, as discussed above, the pregenerated illustration 206 may be related to the videogame 130, such as illustrating the gameplay and/or story of the videogame 130. In other embodiments, the illustration 204 may be a generic illustration. The illustrations 204 may also include a screen shot generated from the recorded screenshots 158. The narrative data structure 170 may include an illustration placeholder 208, and a screenshot from the recorded data 105 may be inserted into the narrative data structure 170 at the placeholder 208, as indicated by arrow 210.

In some embodiments, the recorded data 105 may be inserted directly into the narrative data structure 170. In such an embodiment, numbers, text, and images may be read from the recorded data 105 and placed into the placeholders 182 without additional processing. In other embodiments, the recorded data 105 may be formatted, converted, or undergo any other processing or combination thereof before or during insertion into the narrative data structure 170. In one embodiment, the recorded data 105 may be converted into natural-language text before insertion into the placeholders 182 of the narrative data structure 170. As shown in FIG. 6, for example, some recorded results 148 may undergo natural-language conversion (block 212) before insertion into a placeholder 214. It should be appreciated that numerical data may also be converted into natural-language text. For example, as shown by arrow 216, a numerical health value of the recorded character information 138 may be compared to a threshold (block 218) and natural-language text may be substituted for the numerical health value (e.g., a health value below a threshold may be "dying" and a health value above a threshold may be "healthy").

Any other recorded data 105 may be similarly processed before insertion into the narrative data structure 170. Conversion of the recorded data 105 into natural-language text may improve integration with the pregenerated text 180 and readability of the narrative data structure 170. In some embodiments, recorded data 105 may be inserted into the narrative data structure 170 both directly and with some natural-language text conversion or other processing.

In some embodiments, the recorded progress 132 of the recorded data 105 may be used to aid insertion of other recorded data 105 into the narrative data structure 170. For example, the electronic device 12 may read the recorded progress 132 and corresponding recorded character information 138, recorded dialogue 146, recorded results 148, recorded metrics 150, and any other recorded performance 152 cross-referenced with the progress 132 to determine the point or time of the videogame 130 at which the data was recorded. This information may be used, either alone or in combination with the placeholders 182, to determine the insertion of the recorded data 105 into the narrative data structure 170. For example, recorded progress 132 indicating character information 138 correlating to the beginning of the user's play of the videogame 130 (and/or the story of the videogame 130) may be used to control insertion of such character information into the first section 172 (e.g., beginning) of the narrative data structure 170. Similarly, recorded progress 132 indicating character information 138 correlating to the end of the user's play of the videogame 130 (and/or the story of the videogame 130) may be used to control insertion of such character information into the third section 176 (e.g., end) of the narrative data structure 170.

Figure 7:
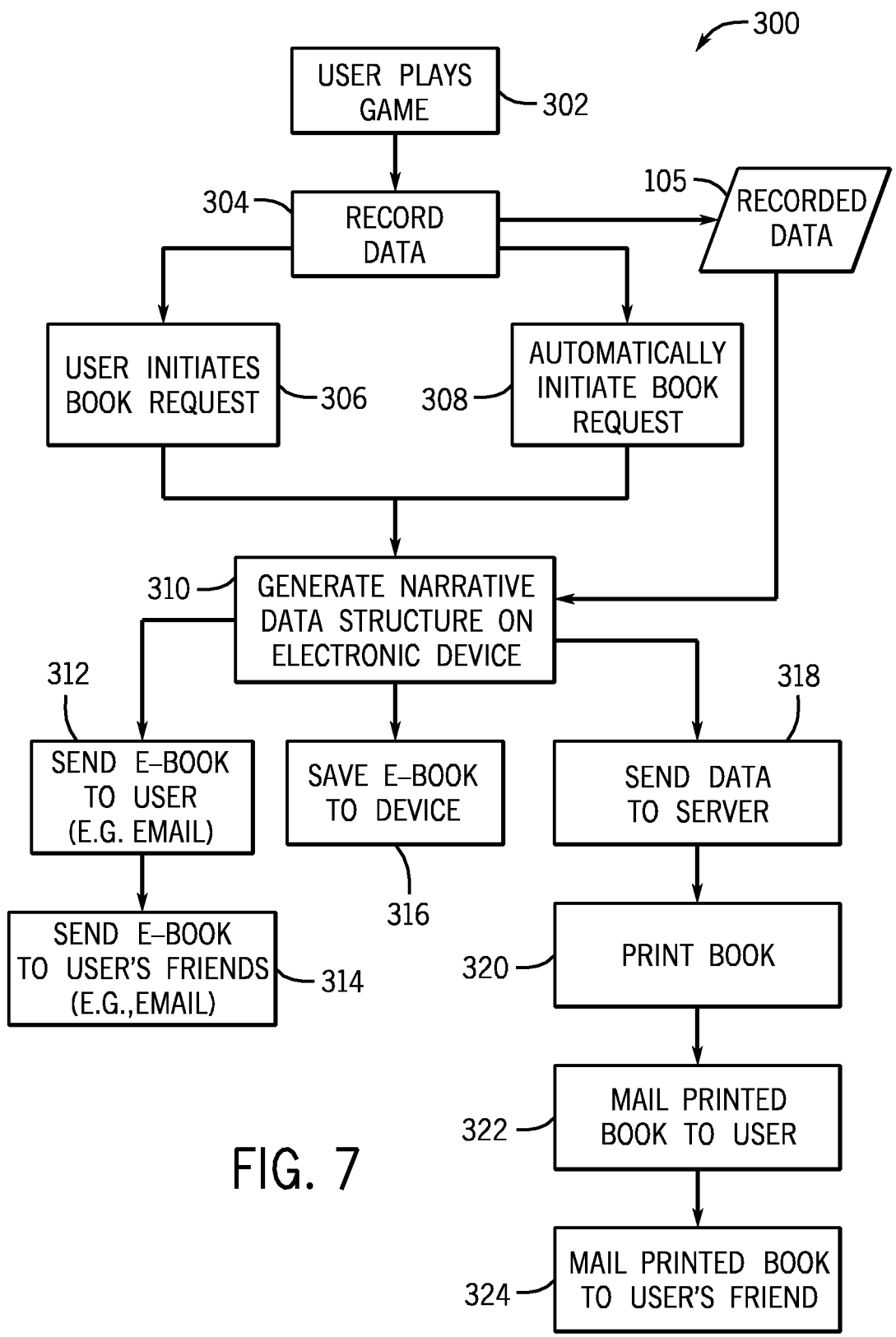
FIG. 7 depicts a process for generating a narrative data structure from the recorded data of a videogame on an electronic device in accordance with an embodiment of the present disclosure.

In some embodiments, generation of the narrative data structure 170 may be performed on the electronic device 12, and an e-book, book, or comic book may be generated on the electronic device 12. In such an embodiment, the generation of the narrative data structure 170 and a book, e-book, or comic book may be referred to as being provided at the "system-level." FIG. 7 depicts a process 300 for generating a narrative data structure from the recorded data 105 of the videogame 130 in accordance with an embodiment of the present disclosure. The process 300 may be implemented in hardware, software (such as instructions encoded on a computer-readable storage media) or a combination thereof. As described above, a user plays a videogame (block 302), during which data is recorded (block 304), such as the recorded character information 138, recorded dialogue 146, recorded results 148, recorded metrics 150 and any other recorded performance 152, recorded progress 132, and/or recorded screenshots 158 discussed above. The recorded data 105 may be stored on the storage 50 of the electronic device 12.

During the videogame 130, or after completion of the videogame 130, the user may initiate a request for a book, e-book, comic book, etc. (block 306). In some embodiments, the user may initiate this request from within the videogame 130. In other embodiments, the user may initiate this request from the operating system of the electronic device 12 or any other software. Alternatively, the electronic device 12 may automatically initiate the request for a book, e-book, comic book, etc. (block 308), such as after completion of the videogame 130 or after a specific amount of progress by the user. The electronic device 12 may then generate the narrative data structure 170 from the recorded data 105 (block 310), using the pregenerated text and placing portions of the recorded data 105 into sections of the narrative data structure 170 as described above in FIG. 6. The pregenerated text 180 may be stored on the electronic device 12 and may be installed as a part of the videogame 130. Alternatively, the electronic device 12 may download the pregenerated text 180 from a server on the network 22 after initiation of the request.

After generation of the narrative data structure 170, the electronic device 12 may perform one or more actions. In some embodiments, these actions may be selected and/or specified by the user, such that the action only occurs if the user has enabled that particular action after generation of the narrative data structure 170. The electronic device 12 may send an electronic copy of the book (e.g., an e-book) to the user (block 312), such as via email or other electronic communication. The electronic device 12 may have the capability to send email directly, or it may send the e-book to a server with email capability. Additionally, the electronic device 12 may send the e-book to the user's contacts (block 314), such as via email or other electronic communication. For example, a user may maintain a "network" of other users who interact with the user via their own electronic devices. These users are often referred to as "friends," "buddies," etc., and may be maintained through the electronic device 12. The electronic device 12 may automatically retrieve a list of the user's "friends" and send the e-book to these contacts. Additionally, the narrative data structure 170 may be saved to the electronic device 12 as an e-book (block 316), such as by writing the e-book to the storage 50.

In some embodiments, a book, comic book, or any other publication may be created from the generated narrative data structure 170. In such an embodiment, data, such as generated narrative data structure, may be sent to a server (block 318), such as over the network 22. The electronic device 12 may also send other information about the user to the server, such as the user's identify, billing information, shipping information, etc. The server may have the capability to print the book (block 320) or cause the book to be printed from a printing location. After printing, the book may be mailed to the user (block 322) and/or the user's friends (block 324).

In other embodiments, the generation of the narrative data structure 170 from recorded data may not be performed on the electronic device 12. Instead, the electronic device 12 may send the recorded data 105 to a remote location for processing. In such an embodiment, the generation of the narrative data structure and book, e-book, or comic book may be referred to as being provided at the "service-level." The service may be offered to a user of an electronic device 12 as a free service, a pay-as-you-go service, or as a subscription service.

Figure 8:
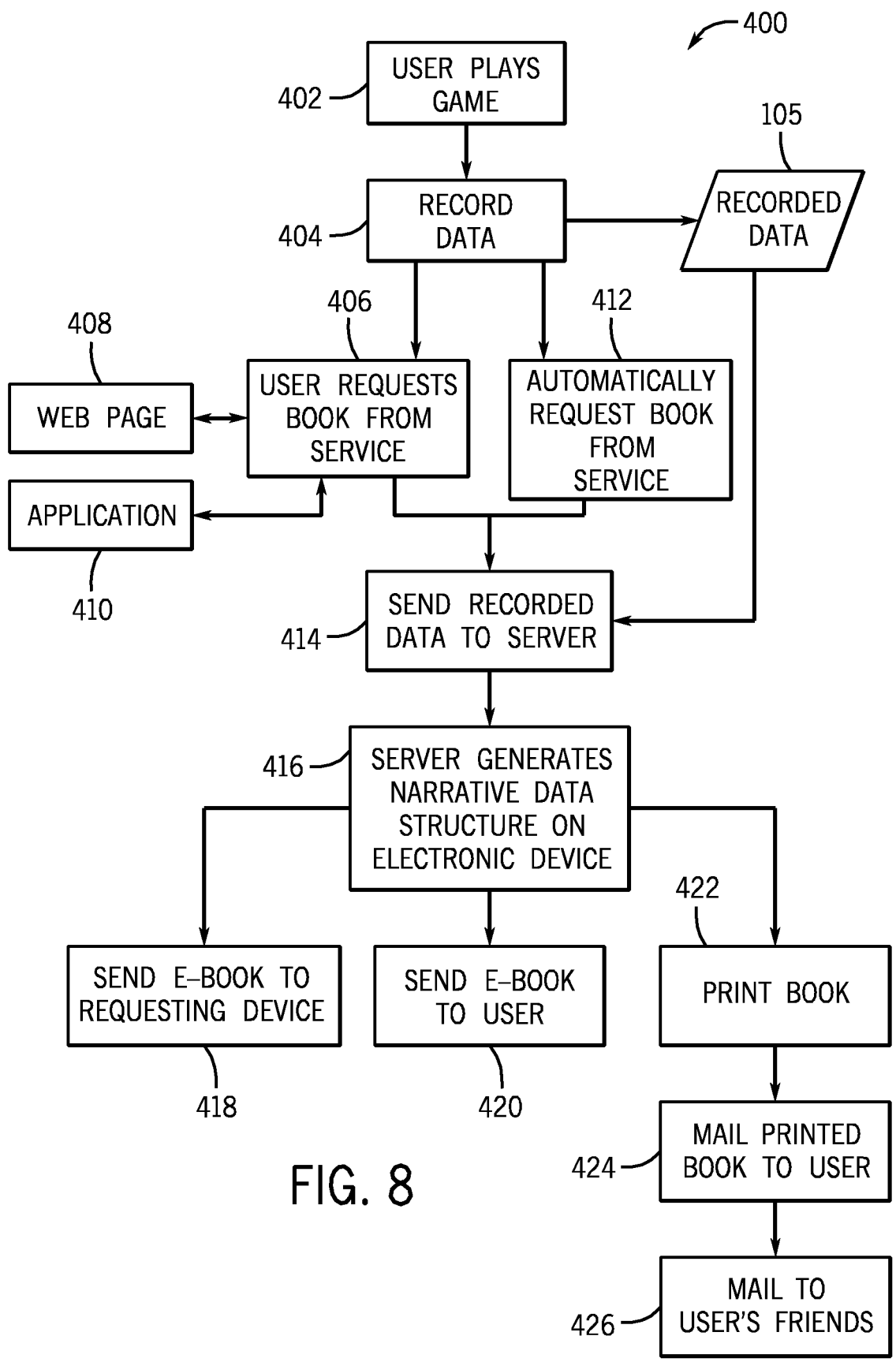
FIG. 8 depicts a process for generating a narrative data structure from the recorded data of a videogame at a remote location in accordance with an embodiment of the present disclosure.

FIG. 8 depicts a process 400 for generating the narrative data structure 170 from the recorded data 105 at a remote location in accordance with an embodiment of the present disclosure. The process 400 may be implemented in hardware, software (such as instructions encoded on a computer-readable storage media) or a combination thereof. As described above, a user plays a videogame (block 402), during which data is recorded (block 404), such as the recorded character information 138, recorded dialogue 146, recorded results 148, recorded metrics 150 any other recorded performance 152, recorded progress 132, and/or recorded screenshots 158 discussed above. The recorded data 105 may be stored on the storage 50 of the electronic device 12.

During the game, or after completion of the videogame 130, the user may initiate a request for a book, e-book, comic book, etc. from the service (block 406). For example, in some embodiments, a user may initiate this request from within the videogame 130. In some embodiments, the user may externally initiate the request from a web page (block 408) or an application (block 410). The user may request the book from same electronic device 12 on which the user played the videogame 130 or on a different electronic device.

Alternatively, the electronic device 12 may automatically request a book, e-book, comic book, etc. from the service (block 412), such as after completion of the videogame or a specific amount of progress by the user. After the request, the electronic device 12 may send the recorded data 105 to a server (block 414), such as over the network 22 to the server 30. The server 30 receives the recorded data 105 and generates the narrative data structure 170 from the recorded data (block 416). As described above in FIG. 6, the server 30 may insert portions of the recorded data 105 into the narrative data structure 170 and may convert portions of the recorded data 105 into natural-language text during or before insertion into the narrative data structure 170. After generation of the narrative data structure 170 from the recorded data 105, the server 30 may perform one or more actions with the generated narrative data structure 170. In some embodiments, the server 30 may send an electronic copy of the book (e.g., an e-book) back to the electronic device 12 that sent the recorded data 105 (block 418). After receiving the e-book, the electronic device 12 may then send the book to a user, save the book, etc. In other embodiments, the server 30 may also send an e-book to the user (block 420), such as via email, instant messaging, text messaging, or other electronic communication. In yet other embodiments, the server 30 may also print, or initiate printing, a book or other printed publication (block 422). After printing, the book may be mailed to the user (block 424) and/or the user's contacts (block 426).

In one embodiment, the videogame may be Mass Effect® published by Electronic Arts, Inc. The videogame Mass Effect® is an RPG that includes many dialogue choices, conflicts, and other gameplay sequences that may be recorded and used in the generation of a book, e-book, or comic book in accordance with an embodiment of the present disclosure.

Figure 9A:
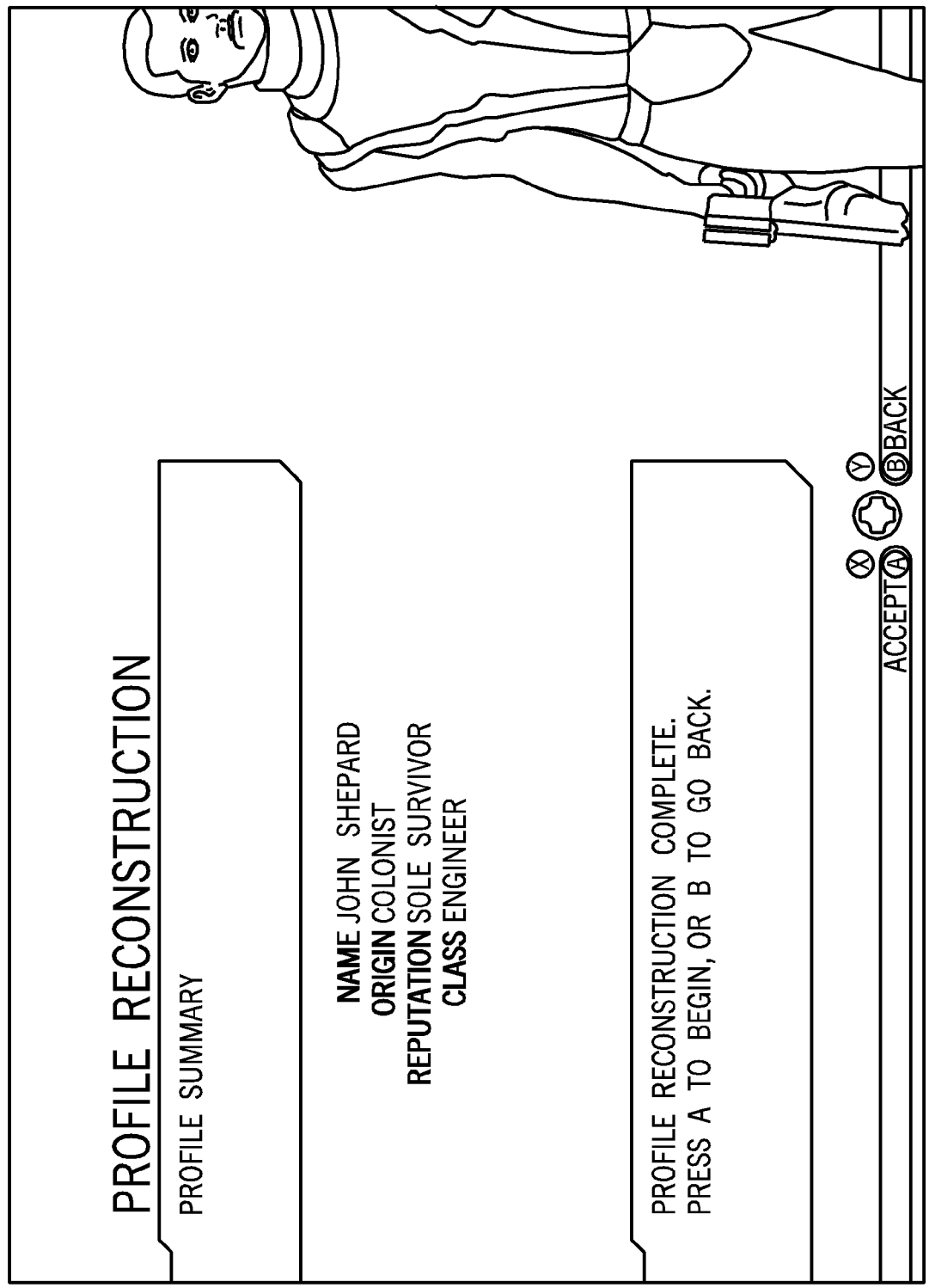
FIGS. 9A-9G are screenshots of the videogame Mass Effect illustrating data that may be recorded and used to generate a narrative data structure in accordance with an embodiment of the present disclosure.
Figure 9B:
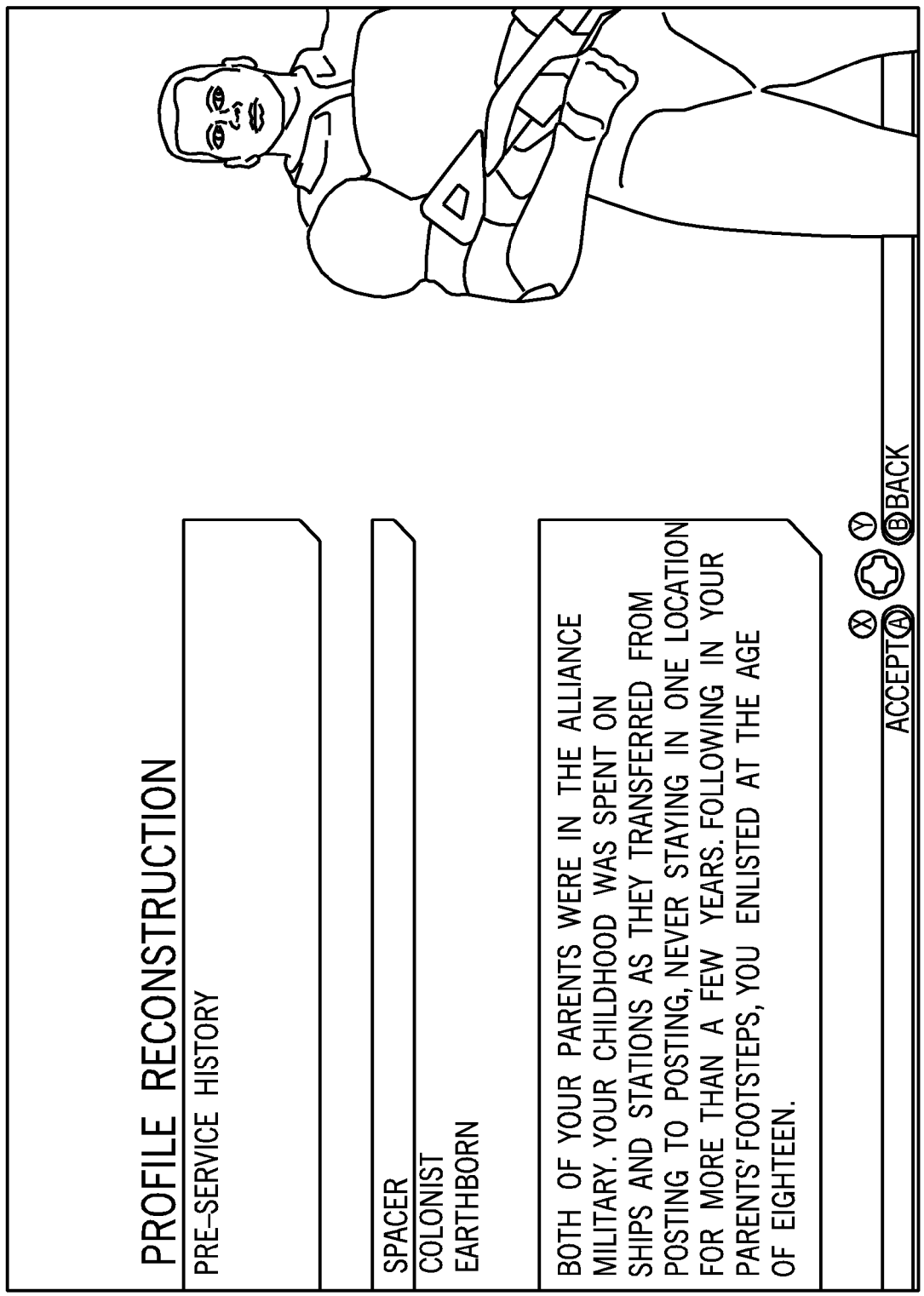
Figure 9C:
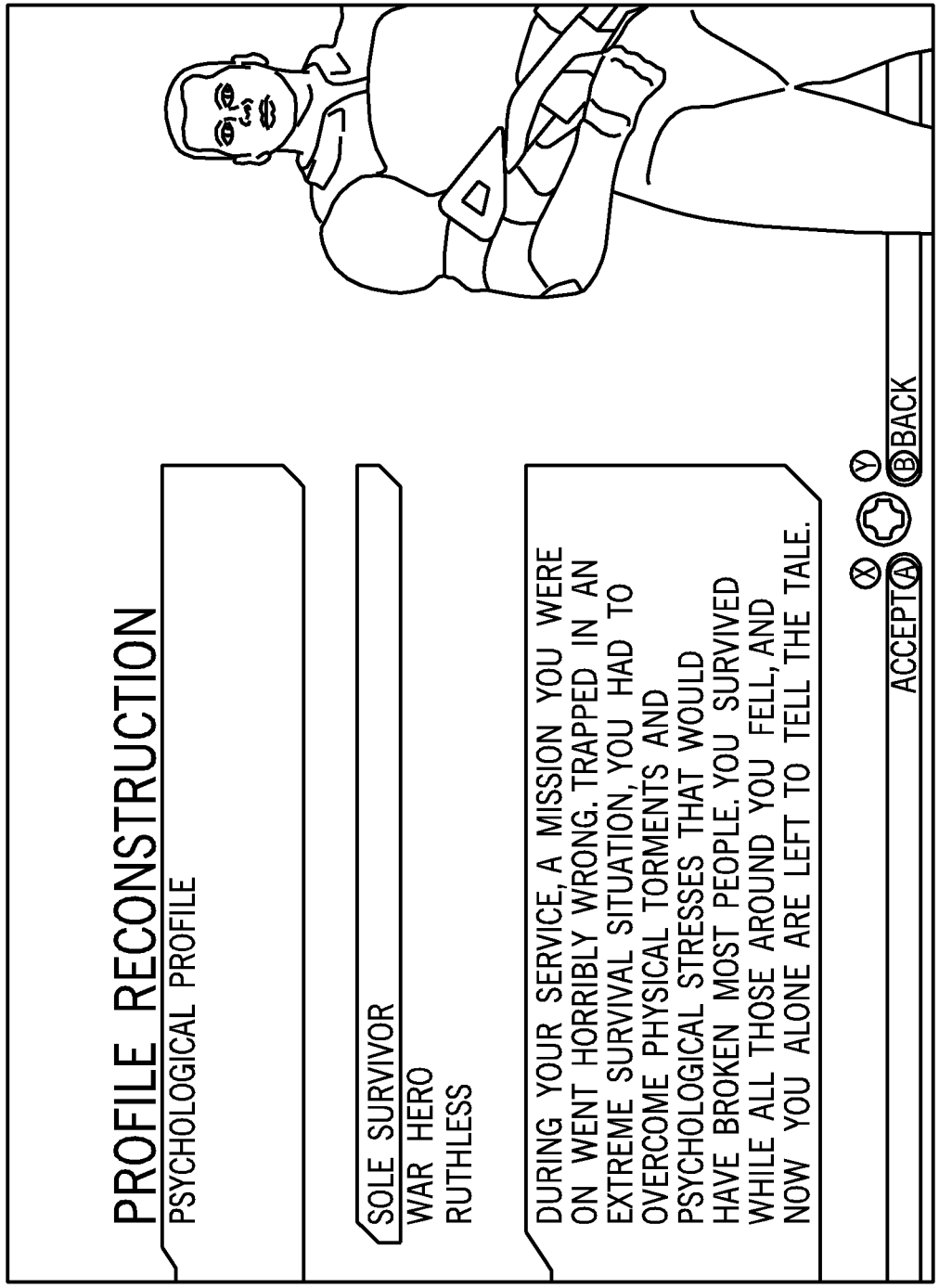
Figure 9D:
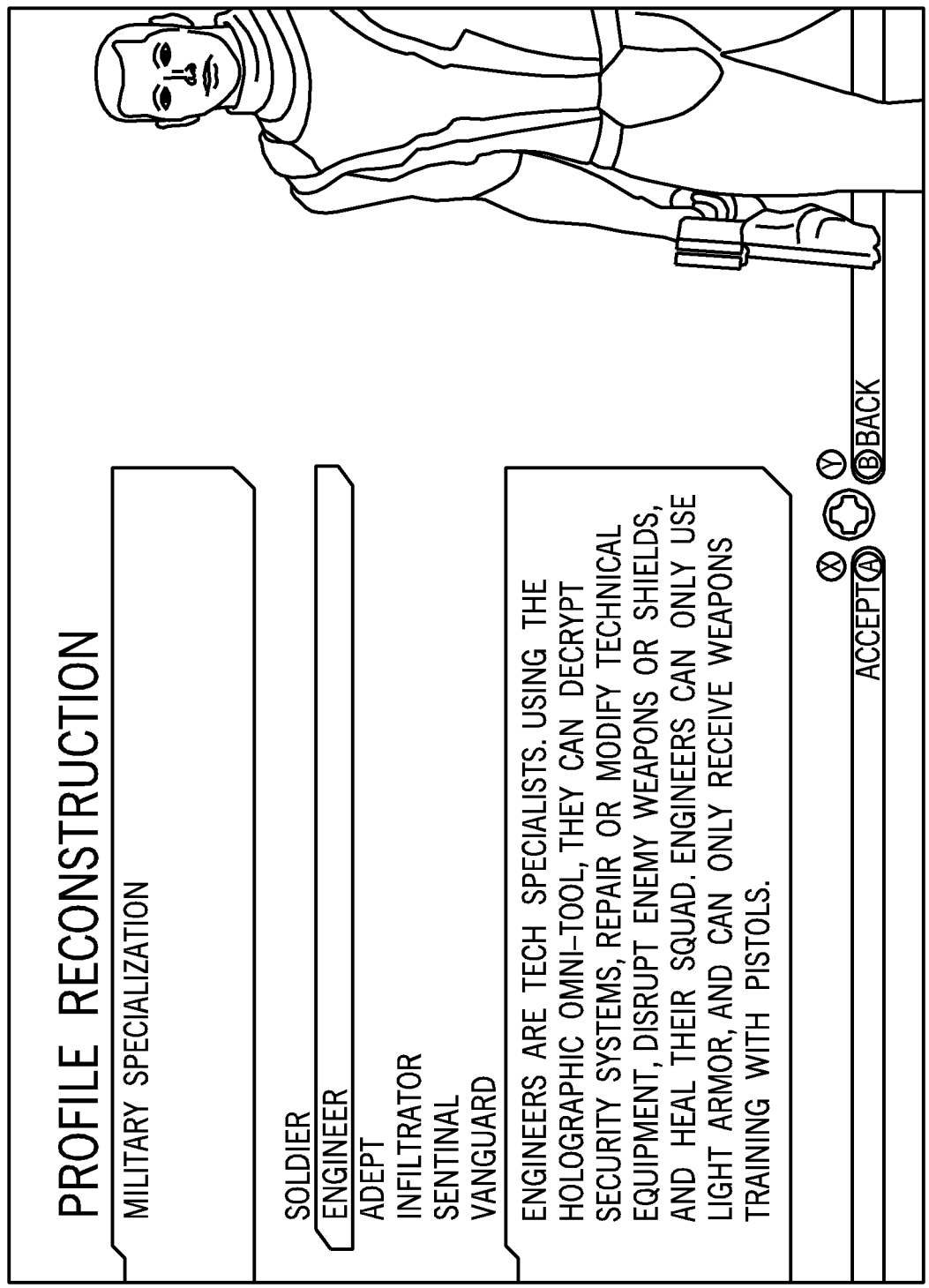
Figure 9E:
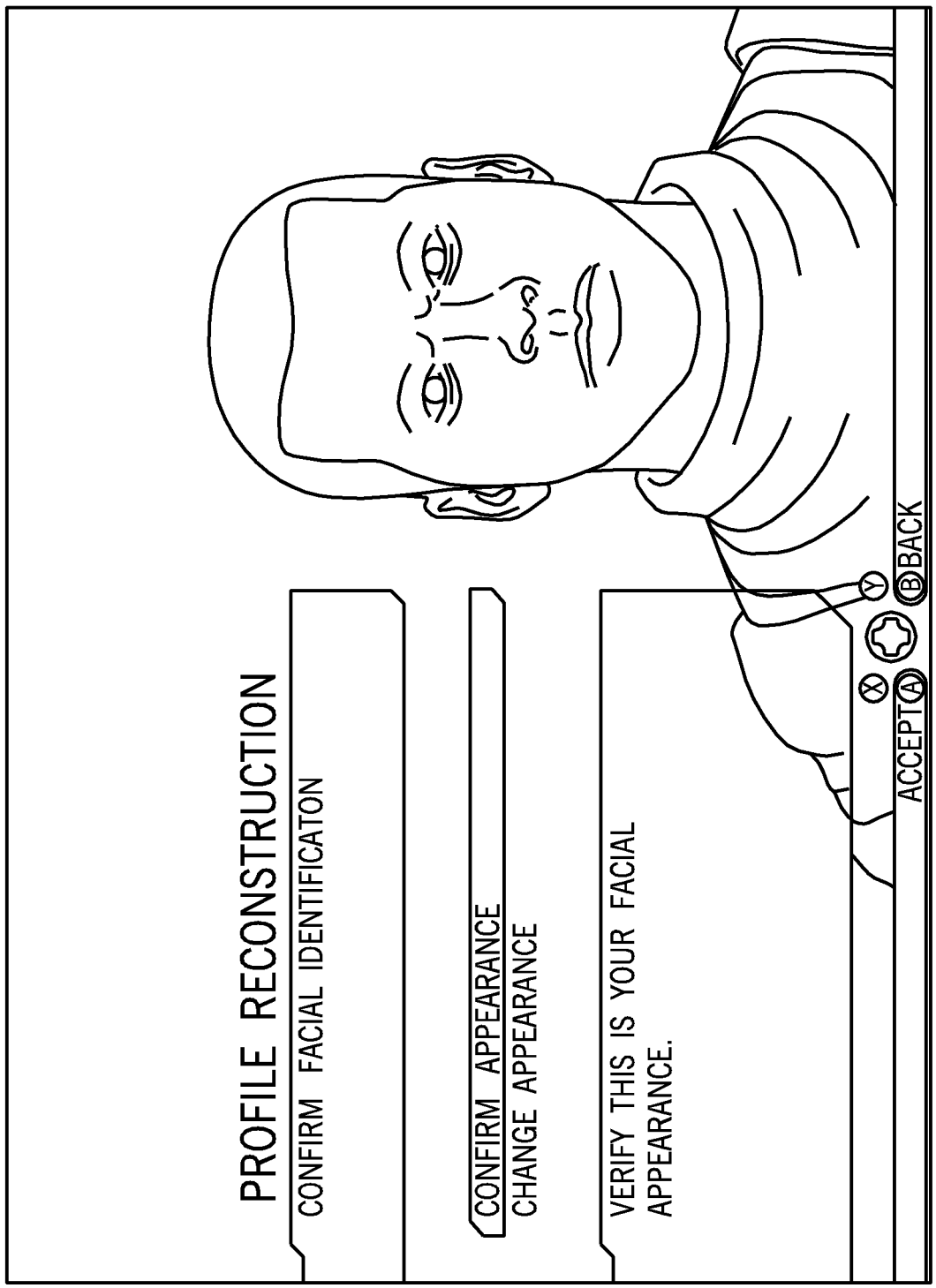

FIGS. 9A-9G depict screenshots of a Mass Effect® gameplay session, illustrating the data that may be recorded and inserted into the narrative data structure 170 for generation into a book, e-book, or comic book. FIG. 9A is a first screenshot of Mass Effect® depicting the attributes of a user's player character. As shown in FIG. 9A, the attributes (shown as part of the character's profile) may include the Name, Origin, Reputation, and Class of the player character. Each of these attributes may be selected by a user. For example, as shown in FIG. 9B, a user may select an Origin ("Pre-Service History") of "Spacer," "Colonist," or "Earthborn." As shown in FIG. 9C, a user may select a Reputation ("Psychological Profile) as "Sole Survivor," "War Hero," or "Ruthless." Similarly, as shown in FIG. 9D, a user may select from a Class ("Military Specialization") as "Soldier," "Engineer," "Adept," etc. Finally, as shown in FIG. 9E, a user may customize the appearance of the player character.

Each of these exemplary attributes (Name, Origin, Reputation, Class, and appearance of the character) may be written to the recorded data 105 and used in the generation of the narrative data structure 170. For example, the player character's name may be inserted into the narrative data structure 170 during the introduction of the character in the narrative data structure 170. In another example, a character's Origin may affect the selection from among multiple pregenerated text 180. Each pregenerated text may convey a different background based on character's Origin as "Spacer," "Colonist," or "Earthborn." It should be appreciated that in this embodiment, the videogame Mass Effect may also include pregenerated text for each Origin that may be used as (or may be the basis of) some of the pregenerated text 180 of the narrative data structure 170.

Figure 9F:
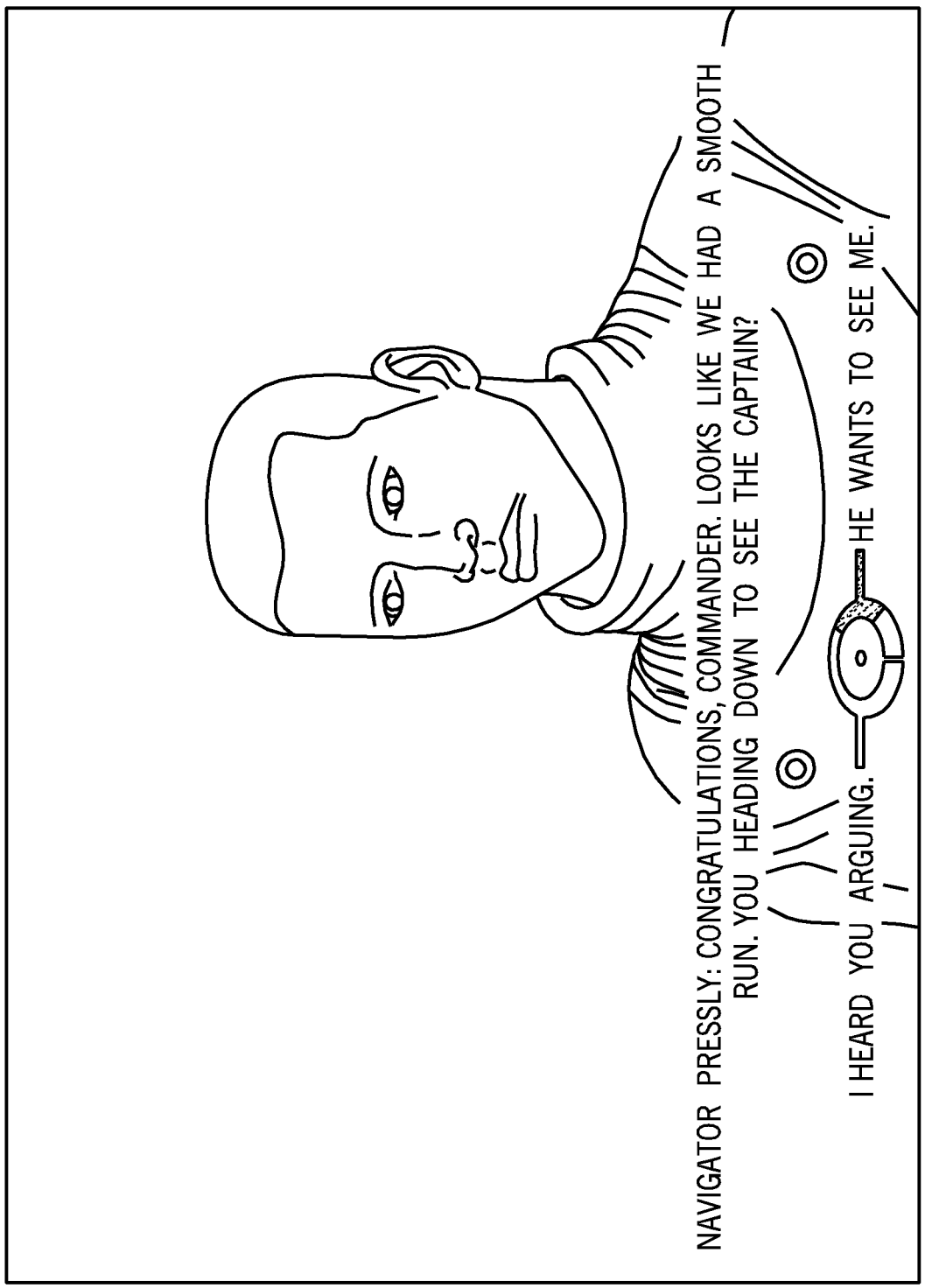
Figure 9G:
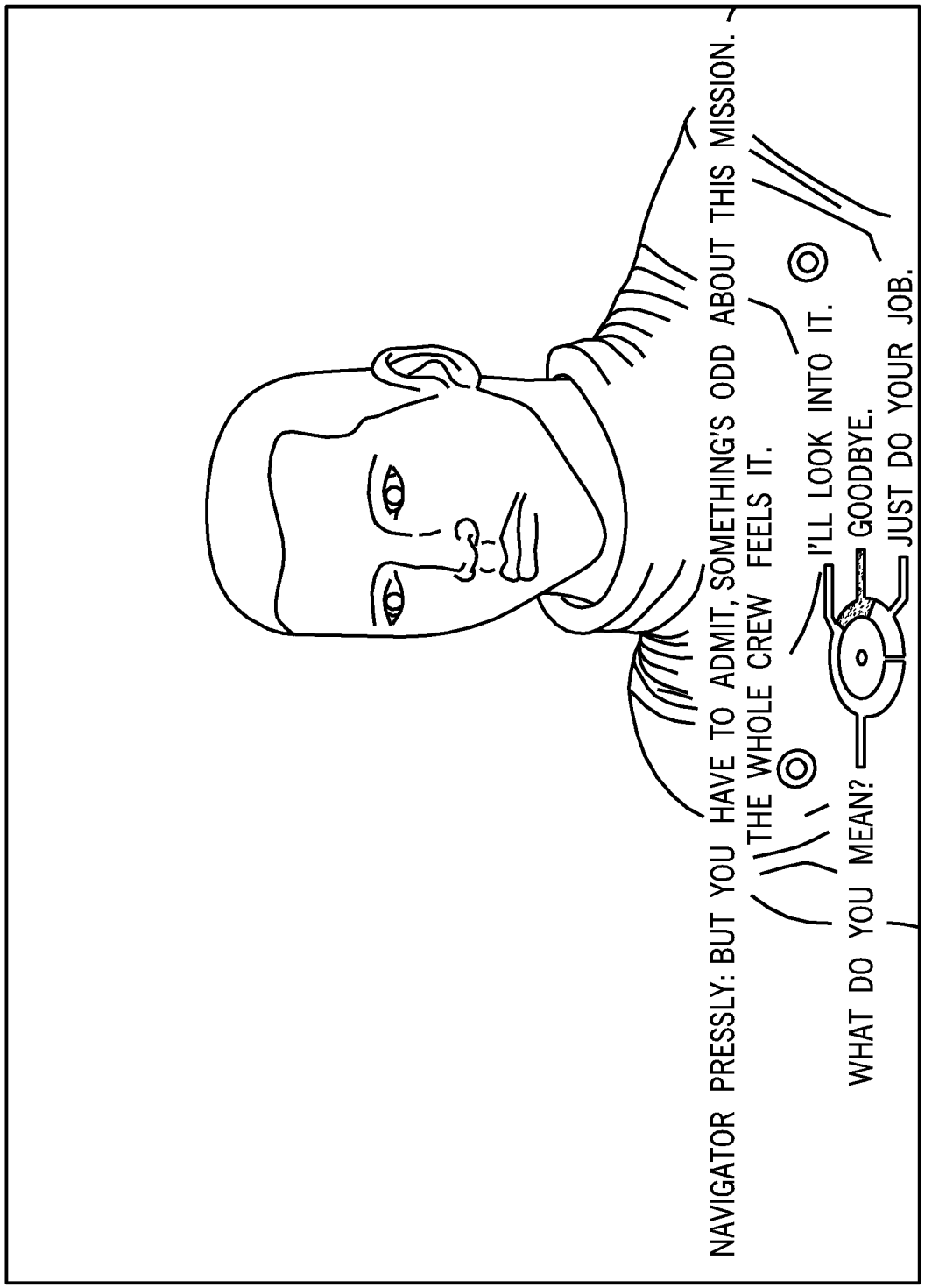

FIGS. 9F and 9G depict choices presented to a user playing Mass Effect that enable the selection of dialogue that may be written to the recorded data 105 in accordance with an embodiment of the present disclosure. As shown in FIG. 9F, a non-player character ("Navigator Pressly") asks the user a question ("You heading down to see the captain?"). The user is provided with the dialogue responses: "I heard you arguing"; or "He wants to see me." To respond to the non-player character, the user selects one of these dialogue responses. The selection of one of these dialogue responses may be written to the recorded data 105 so that the dialogue may be inserted into the narrative data structure. Additionally, in games such as Mass Effect, the selection of a dialogue response may make available additional or different dialogue responses. Thus, the entire conversation between the user's player character and the non-player character may be written to the recorded data 105 and may vary during each gameplay session.

FIG. 9G illustrates a more complex choice presented to a user playing Mass Effect, allowing the selection of one or multiple dialogue responses. As shown in FIG. 9F, a non-player character ("Navigator Pressly") is conversing with a user. The user is provided with multiple dialogue responses: "What do you mean?"; "I'll look into it."; "Goodbye"; and "Just do your job." Again, the selection of one (or more) of these dialogue responses may be written to the recorded data 015. During generation of the narrative data structure 170, any one of these dialogue responses may be inserted, and combined with pregenerated text 170, to create the narrative data structure 170. For example, a dialogue response may be combined with the pregenerated text as follows: "<character's name> angrily responded <dialogue response>" wherein the <character's name> and <dialogue response> may be inserted from the recorded character information 138 and recorded dialogue 146 of the recorded data 105. In this manner, an entire conversation based on the user's choices of the dialogue responses and pregenerated text may be generated into the narrative data structure 170.

What is claimed is:

1. A method, comprising:
    recording data from a user's experience of playing a video game on an electronic device; and
    generating a narrative data structure, further comprising:
        using the recorded data as a basis to automatically select narrative text that is separate from and narrative of the recorded data; and
        inserting one or more portions of the recorded data into the narrative data structure; and
        inserting one or more portions of the narrative text into the narrative data structure.

2. The method of claim 1, comprising generating a book, an e-book, or a combination thereof from the narrative data structure.

3. The method of claim 1, wherein the recorded data comprises dialogue from the videogame.

4. The method of claim 1, wherein the recorded data comprises results of a user's interaction with the video game.

5. The method of claim 1, wherein the recorded data comprises information of one or more characters of the video game.

6. The method of claim 1, wherein the recorded data comprises screenshots of the video game.

7. The method of claim 1, wherein inserting one or more portions of the recorded data comprises converting one or more portions of the recorded data into natural-language text.

8. The method of claim 1, wherein the narrative data structure comprises a plurality of placeholders, wherein one more portions of the recorded data are inserted into one or more of the plurality of placeholders.

9. A method, comprising:
    receiving data at a server from an electronic device over a network coupled to the electronic device, wherein the data comprises data recorded from a user's play of a video game;
    converting the recorded data to natural-language text;
    generating a narrative data structure by using the natural-language text to automatically select narrative text that is separate from and narrative of the recorded data; and
        inserting one or more portions of the natural-language text into the narrative data structure; and
        inserting one or more portions of the narrative text into the narrative data structure.

10. The method of claim 9, comprising printing a book from the narrative data structure.

11. The method of claim 9, comprising generating an e-book from the narrative data structure on the server.

12. The method of claim 9, comprising sending an e-book based on the narrative data structure to the electronic device over the network.

13. The method of claim 9, comprising sending the book to a user of the electronic device.

14. A system, comprising:
    an electronic device configured to:
        record dialogue, character information, a user's performance, screenshots, or a combination thereof, from the user's play of a videogame;
        automatically select narrative text that is separate from and narrative of the recorded dialogue, character information, a user's performance, screenshots, or combinations thereof; and
        combine the recorded dialogue, character information, a user's performance, screenshots, or combinations thereof with the narrative text into a narrative data structure.

15. The system of claim 14, wherein the electronic device comprises a mobile phone, a videogame console, or a personal computer.

16. The system of claim 14, wherein the electronic device is configured to generate an e-book based on the narrative data structure.

17. The system of claim 14, wherein the electronic device is further configured to send the narrative data structure to a server over a network coupled to the electronic device.

18. The system of claim 14, comprising a server configured to print a book based on the narrative data structure.

19. The system of claim 14, comprising an e-book, book, or comic book generated from the narrative data structure.

20. The system of claim 16, wherein the electronic device is further configured to send the book to a user.

21. A method, comprising:
    recording dialogue, character information, screenshots, and a user's performance from a videogame, wherein the dialogue, character information, screenshots, and user's performance are based on a user's interaction with the video game;
    automatically selecting narrative text that is separate from and narrative of the recorded dialogue, character information, a user's performance, screenshots, or combinations thereof;
    combining the recorded dialogue, character information, a user's performance, screenshots, or combinations thereof with the narrative text into a narrative data structure
    generating an e-book from the narrative data structure.

22. The method of claim 21, comprising: sending the recorded character information, screenshots, and the user's performance over a network to a server at a remote location.

23. The method of claim 21, further comprising converting the recorded dialogue, character information, and the user's performance to natural language text.

24. A method, comprising:
    recording data pertaining to a user's interactions with a videogame, wherein the data comprises character dialogue, character information, screenshots, and user's performance;
    converting at least a portion of the recorded data to natural-language text;
    generating a narrative data structure, further comprising:

using the recorded data, the natural language text as a basis to automatically select a narrative illustration that is separate from and narrative of the recorded data; and inserting the narrative illustration into the narrative data structure; and generating a book, a comic book, or an e-book from the narrative data structure.

25. The method of claim 24, comprising: sending the recorded data over a network to a server at a remote location.

* * * * *